(12) United States Patent
McCormack

(10) Patent No.: US 8,531,525 B2
(45) Date of Patent: Sep. 10, 2013

(54) SURVEILLANCE SYSTEM AND METHOD FOR OPERATING SAME

(75) Inventor: Kenneth McCormack, Albany, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 877 days.

(21) Appl. No.: 12/644,308

(22) Filed: Dec. 22, 2009

(65) Prior Publication Data

US 2011/0149072 A1  Jun. 23, 2011

(51) Int. Cl.
*H04N 7/18* (2006.01)

(52) U.S. Cl.
USPC .......................................... 348/156; 348/143

(58) Field of Classification Search
USPC .................. 348/143, 152, 153, 154, 155, 156, 348/169, 211.4
See application file for complete search history.

(56) References Cited

U.S. PATENT DOCUMENTS

| | | | |
|---|---|---|---|
| 6,714,236 B1 | 3/2004 | Wada et al. | |
| 6,992,702 B1 | 1/2006 | Foote et al. | |
| 7,046,143 B2 | 5/2006 | Al-Khateeb | |
| 7,349,008 B2 | 3/2008 | Rui et al. | |
| 2004/0100563 A1 * | 5/2004 | Sablak et al. | 348/211.4 |
| 2006/0082655 A1 | 4/2006 | Vanderwilt et al. | |
| 2006/0126737 A1 | 6/2006 | Boice et al. | |
| 2006/0203098 A1 | 9/2006 | Henninger, III et al. | |
| 2007/0035623 A1 | 2/2007 | Garoutte et al. | |
| 2007/0064107 A1 | 3/2007 | Aggarwal et al. | |
| 2007/0236570 A1 | 10/2007 | Sun et al. | |
| 2007/0279494 A1 | 12/2007 | Aman et al. | |
| 2007/0291104 A1 | 12/2007 | Petersen et al. | |
| 2008/0106597 A1 | 5/2008 | Amini et al. | |
| 2008/0211929 A1 | 9/2008 | Uchihara | |
| 2008/0267453 A1 | 10/2008 | Avrahami | |
| 2009/0079824 A1 | 3/2009 | Winsor | |

* cited by examiner

*Primary Examiner* — Allen Wong
(74) *Attorney, Agent, or Firm* — MH2 Technology Law Group, LLP

(57) ABSTRACT

A method for operating a surveillance system includes performing a first portion of an automated visual surveillance tour of a predetermined control area by inducing movement of at least one visual surveillance camera at a first camera tour speed. The method also includes recording at least one first video image frame of the predetermined control area. The method further includes recording at least one second video image frame of the predetermined control area. The method also includes automatically determining whether a region of interest exists within the predetermined control area. The method further includes performing a second portion of the automated visual surveillance tour by shifting the induced movement of the at least one visual surveillance camera to a second camera tour speed. The method also includes automatically dwelling on the region of interest.

22 Claims, 4 Drawing Sheets

SURVEILLANCE SYSTEM AND METHOD FOR OPERATING SAME

BACKGROUND OF THE INVENTION

1. Field of the Invention

The embodiments described herein relate generally to visual surveillance and, more particularly, to a method and system for visual surveillance camera control.

2. Description of Related Art

At least some known security systems include visual surveillance systems that are used to monitor physical activities within a predetermined area. At least some of these known visual surveillance systems include pan/tilt/zoom (PTZ) cameras that pan about a vertical axis, tilt about a horizontal axis, and zoom in on selected objects and regions. Known PTZ cameras and associated systems are operated in two modes, that is, manual and automatic. While operating the camera in a manual mode, an operator is actively controlling the camera and using the camera's PTZ features to investigate areas of interest. Using a dedicated operator increases operational costs. While operating some known PTZ cameras in an automatic mode of operation, the camera is directed to repeat a set pattern of coverage. Such a predetermined pattern is referred to as a "tour". In addition, some known camera systems repetitively perform tours that have a predetermined periodicity.

BRIEF SUMMARY OF THE INVENTION

In one aspect, a method is provided. The method includes performing a first portion of an automated visual surveillance tour of a predetermined control area by inducing movement of at least one visual surveillance camera at a first camera tour speed. The method also includes recording at least one first video image frame of the predetermined control area. The method further includes recording at least one second video image frame of the predetermined control area. The method also includes automatically determining whether a region of interest exists within the predetermined control area. The method further includes performing a second portion of the automated visual surveillance tour by shifting the induced movement of the at least one visual surveillance camera to a second camera tour speed. The method also includes automatically dwelling on the region of interest.

In another aspect, a camera assembly is provided. The camera assembly includes at least one visual surveillance camera. The camera assembly also includes at least one processor coupled in communication with the at least one visual surveillance camera. The at least one processor is programmed to record at least one first video image frame of a predetermined control area, record at least one second video image frame of the predetermined control area, determine a region of interest, and command the at least one visual surveillance camera to dwell on the region of interest.

In yet another aspect, a visual surveillance system is provided. The visual surveillance system includes at least one visual surveillance camera. The visual surveillance system also includes at least one video image storage device coupled in communication with the at least one visual surveillance camera. The visual surveillance system further includes at least one processor coupled in communication with the at least one visual surveillance camera and the at least one video image storage device. The at least one processor is programmed to record at least one first video image frame of a predetermined control area, record at least one second video image frame of the predetermined control area, determine a region of interest, and command the at least one visual surveillance camera to dwell on the region of interest.

The embodiments described herein provide a visual surveillance camera system having operational functionality that facilitates discrimination of changes in circumstances in predetermined areas of coverage. As such, the embodiments described herein enable such automated discrimination and further enable subsequent automated selective investigations of such circumstances.

BRIEF DESCRIPTION OF THE DRAWINGS

FIG. 1 is a schematic view of an exemplary visual surveillance system.

FIG. 2 is a schematic diagram of an exemplary pan/tilt/zoom (PTZ) camera assembly that may be used with the visual surveillance system shown in FIG. 1.

FIG. 3 is a schematic view of an exemplary camera control system that may be used with the visual surveillance system shown in FIG. 1.

FIG. 4 is a flowchart of a method for operating the visual surveillance system, the PTZ camera assembly, and the camera control system shown in FIGS. 1-3, respectively.

DETAILED DESCRIPTION OF THE INVENTION

The embodiments described herein provide an automated visual surveillance system and a method for operating such visual surveillance system. More specifically, rather than rely upon manual investigation of circumstances of interest, or rely upon sufficient automated capture of circumstances of interest during a routine tour of a surveillance camera, the visual surveillance system described herein automatically discriminates between current circumstances and previous circumstances and further enables subsequent automated selective investigations of changes and/or differences between such circumstances. Automatic discrimination of changed circumstances is facilitated by recording and storing video images generated and saved for each period of a predetermined surveillance tour. During subsequent surveillance tours, video images from a prior pass are recalled and compared to current video images, also being recorded, and a determination is made as to whether a threshold difference between passes exists. If no differences are detected, then the tour continues as usual. If differences are determined, then deviations are made to the tour to investigate the differences. The tour deviations are automatically generated and specifics of panning, tilting, and zooming (PTZ) are derived from the video content. The surveillance system includes a PTZ camera that reacts to the changes and/or differences by centering and dwelling on the areas associated with the differences in order to improve resolution of the recorded video. After a predetermined period of time, the camera resumes the predetermined automatic tour.

Figure 1:
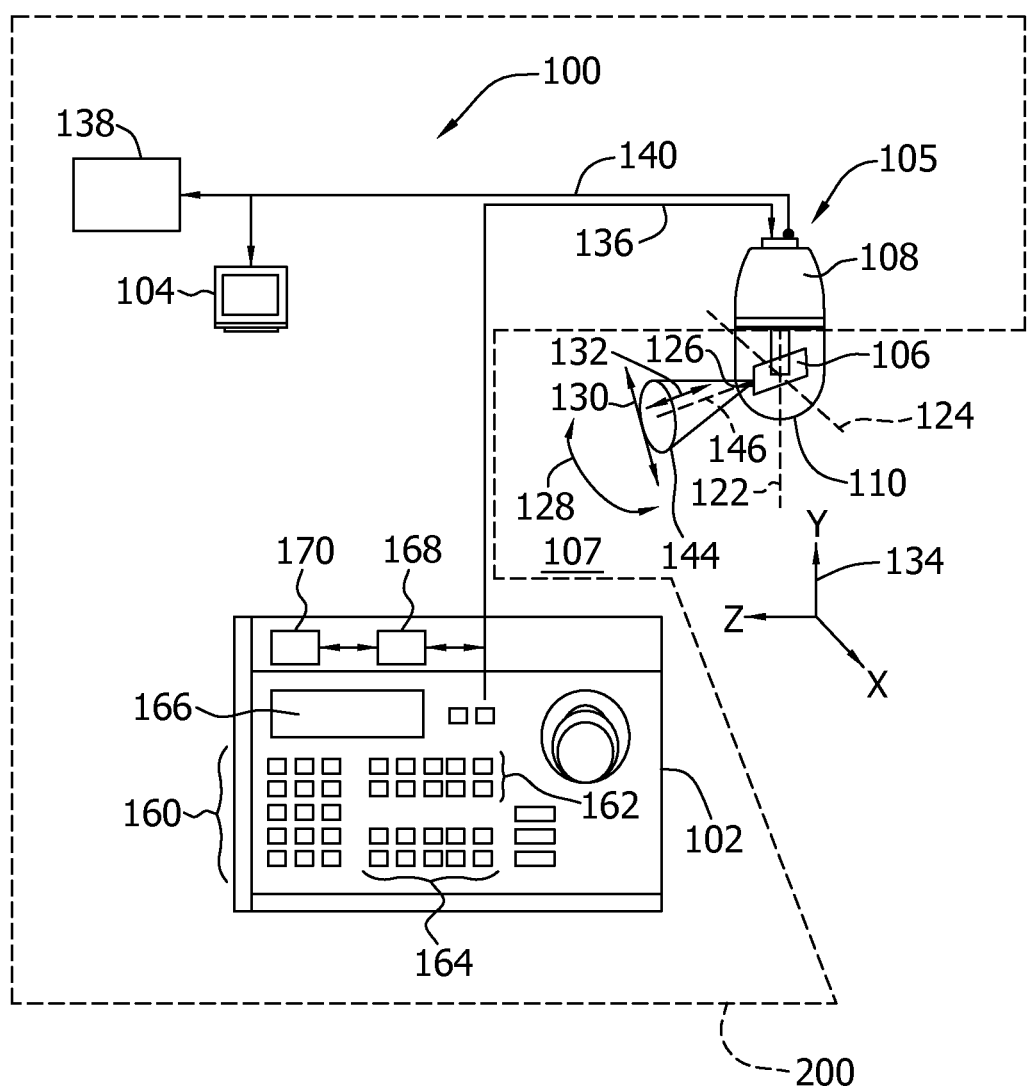
FIGS. 1-4 show exemplary embodiments of the visual surveillance system and methods described herein.

FIG. 1 is a schematic view of an exemplary visual surveillance system 100. Visual surveillance system 100 includes a control panel 102, a display monitor 104, and a visual surveillance camera assembly 105. In the exemplary embodiment, visual surveillance system 100 is a single-camera application configured to visually surveil a predetermined control area 107. Such control areas 107 may include, but not be limited to, access-controlled rooms that are typically unoccupied. Alternatively, visual surveillance system 100 includes any number of camera assemblies 105 to provide coverage of larger or more complex control areas 107 that may include, but not be limited to, large perimeters.

In the exemplary embodiment, visual surveillance camera assembly 105 includes a visual surveillance camera 106 housed in an enclosure 108 having a dome 110 for protecting camera 106 from the environment where camera 106 is located. In the exemplary embodiment, dome 110 is tinted to allow camera 106 to acquire video images of the environment outside of enclosure 108 and prevent individuals in the environment being observed by camera 106 from determining an orientation of camera 106. Alternatively, dome 110 is not tinted.

Also, in the exemplary embodiment, camera 106 is an articulated pan/tilt/zoom (PTZ) camera that is configured to pan about a vertical pan axis 122, tilt about a horizontal tilt axis 124, and control a lens assembly 126 to control a zoom feature of camera 106. For example, PTZ video camera assembly 105 includes a pan mechanism (not shown in FIG. 1) that includes a pan motor and encoder (not shown) and a tilt mechanism that includes a tilt motor and encoder (not shown). The pan and tilt motors induce a panning movement and a tilting movement, respectively. The pan and tilt encoders determine an angular position of the pan and tilt motors, respectively, and generate position signals that are used with a zoom setting to determine an area in the field of view. Panning movement of camera 106 is represented by pan direction arrow 128, tilting movement of camera 106 is represented by tilt arrow 130 and the changing of the focal length of lens assembly 126 of camera 106, i.e., zooming, is represented by zoom arrow 132. As shown with reference to a coordinate system 134, panning motion tracks movement along an x-axis, titling motion tracks movement along a y-axis and focal length adjustment is used to track movement along a z-axis. Signals representing commands to control such capabilities are transmitted from control panel 102 through a control data conduit 136. Alternatively, control panel 102 and camera assembly 105 communicate via radio-frequency (RF).

Further, in the exemplary embodiment, video image data signals are transmitted from camera 106 to display monitor 104 and fat least one storage device 138 through a video data conduit 140. Alternatively, camera 106 and display monitor 104 and/or storage device 138 communicate via radio-frequency (RF). More specifically, lens assembly 126 views an area of control area 107, which is typically remote from control panel 102, and that is in a view 144 along a viewing axis 146 of lens assembly 126. Video images of control area 107 are converted by camera 106 into a plurality of signals that are transmitted to display monitor 104 and/or storage device 138. View 144 is defined as the area within a field of view of camera 106 at a predetermined position including a pan angle, tilt angle, and zoom setting. A video image is acquired of view 144 by camera 106 and a video image signal is generated and transmitted to storage device 138.

In the exemplary embodiment, control panel 102 includes an alphanumeric keypad 160 for entering text and numbers, including inquiries and commands. Control panel 102 further includes a plurality of preset switches 162 that may be programmed to execute macros that automatically control camera assembly 105 including, but not limited to, zoom features of lens assembly 126 and the panning and tilting mechanisms. A plurality of buttons 164 are used for predetermined control functions and/or user-defined functions, such as a camera selection in a multi-camera visual surveillance system. A display 166 is used to display a status of visual surveillance system 100 and/or parameters associated with camera 106.

Also, in the exemplary embodiment, visual surveillance system 100, and more specifically, control panel 102 includes at least one control panel processor 168 and control panel memory 170. Further, in the exemplary embodiment, control panel processor 168 and control panel memory 170 are located external to camera assembly 105, such as in control panel 102, or in a personal computer (PC) or other standalone computer system capable of performing the functions described herein. Processor 168 receives programmed instructions from sources that include, but are not limited to, software and firmware. Processor 168 also receives data from control panel memory 170 and performs various operations using the data and instructions. As used herein, references to "software" and "firmware" are interchangeable, and are to be understood to refer to and include any computer program stored in memory 170 for execution by processor 168.

Also, as used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels. Moreover, processor 168 as described herein processes information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, and/or a distributed control system.

Further, in the embodiments described herein, memory 170 may include, without limitation, a computer-readable medium, such as a random access memory (RAM), read-only memory (ROM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, alternatively, memory 170 may include programmable read-only memory (PROM), erasable programmable read-only memory (EPROM) and electrically erasable programmable read-only memory (EEPROM). RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, imaging system control commands. The execution of sequences of instructions is not limited to any specific combination of hardware circuitry and software instructions.

Moreover, in the embodiments described herein, input channels may include, without limitation, sensors and/or computer peripherals associated with an operator interface, such as a mouse and a keyboard. Further, in the exemplary embodiment, output channels may include, without limitation, control data conduit 136. Memory 170 may also include storage locations for preset macro instructions that may be accessible using one of a plurality of preset switches 152.

In the exemplary embodiment, visual surveillance system 100 includes a camera control system 200 that includes control panel 102, display monitor 104, and a portion of visual surveillance camera assembly 105. Camera control system 200 is described in more detail below.

Figure 2:
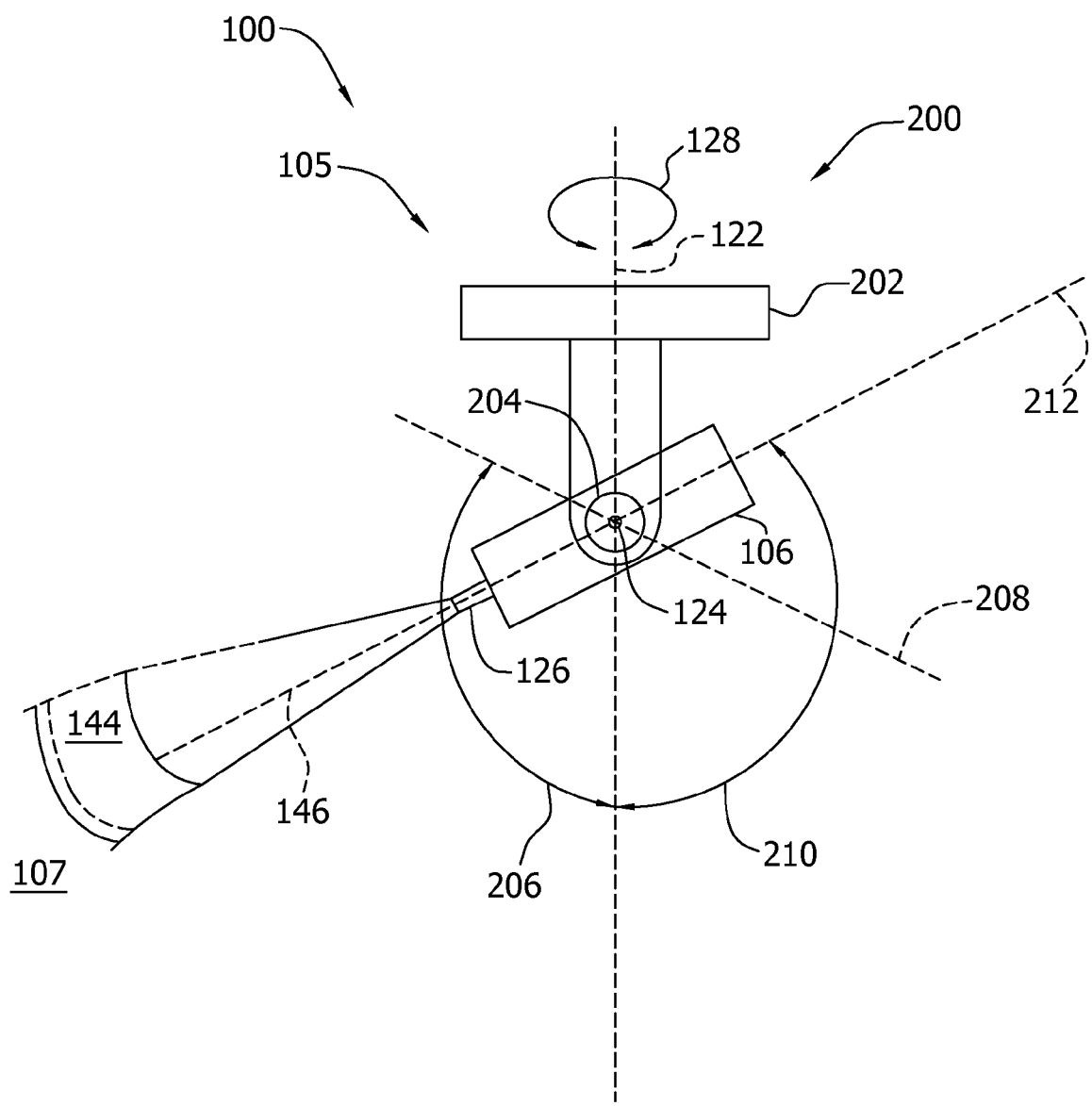

FIG. 2 is a schematic view of exemplary pan/tilt/zoom (PTZ) visual surveillance camera assembly 105 that may be used with visual surveillance system 100 and camera control system 200. As described above, visual surveillance camera assembly 105 includes PTZ-type visual surveillance camera 106. Assembly 105 also includes a pan mechanism 202 that is configured to rotate camera 106 about vertical pan axis 122 in a clockwise and a counter-clockwise pan direction as indicated by pan direction arrow 128. In the exemplary embodiment, pan mechanism 202 is configured to pan in any arcual portion of 360° about pan axis 122. Pan mechanism 202 is also configured to rotate camera 106 at a plurality of predetermined speeds, thereby at least partially defining a plurality of predetermined tour speeds.

Assembly 105 further includes a tilt mechanism 204 coupled to pan mechanism 202 and configured to rotate camera 106 about horizontal tilt axis 124 (illustrated normal to the page). In the exemplary embodiment, tilt mechanism 204 is configured to rotate camera 106 about tilt axis 124 through an arc greater than 90° that includes an angle 206 measured with respect to pan axis 122 and a first tilt position 208, and an angle 210 measured with respect to pan axis 122 and a second tilt position 212. Therefore, in the exemplary embodiment, the total tilt angle of camera 106 is greater than 180°. Tilt mechanism 204 is also configured to tilt camera 106 at a plurality of predetermined speeds, thereby at least partially defining the plurality of predetermined tour speeds.

In the exemplary embodiment, camera control system 200 includes control panel 102 (shown in FIG. 1), display monitor 104 (shown in FIG. 1), and portions of surveillance camera assembly 105, including, but not limited to, pan mechanism 202, tilt mechanism 204, and lens assembly 126. Therefore, in the exemplary embodiment, control system 200 is coupled in communication with camera 106. Control panel 102, or more specifically, processor 168 may generate demanded position signals that are transmitted to assembly 105 to position camera 106 at a predetermined position with respect to pan axis 122, tilt axis 124, and a zoom setting of lens assembly 126.

Figure 3:
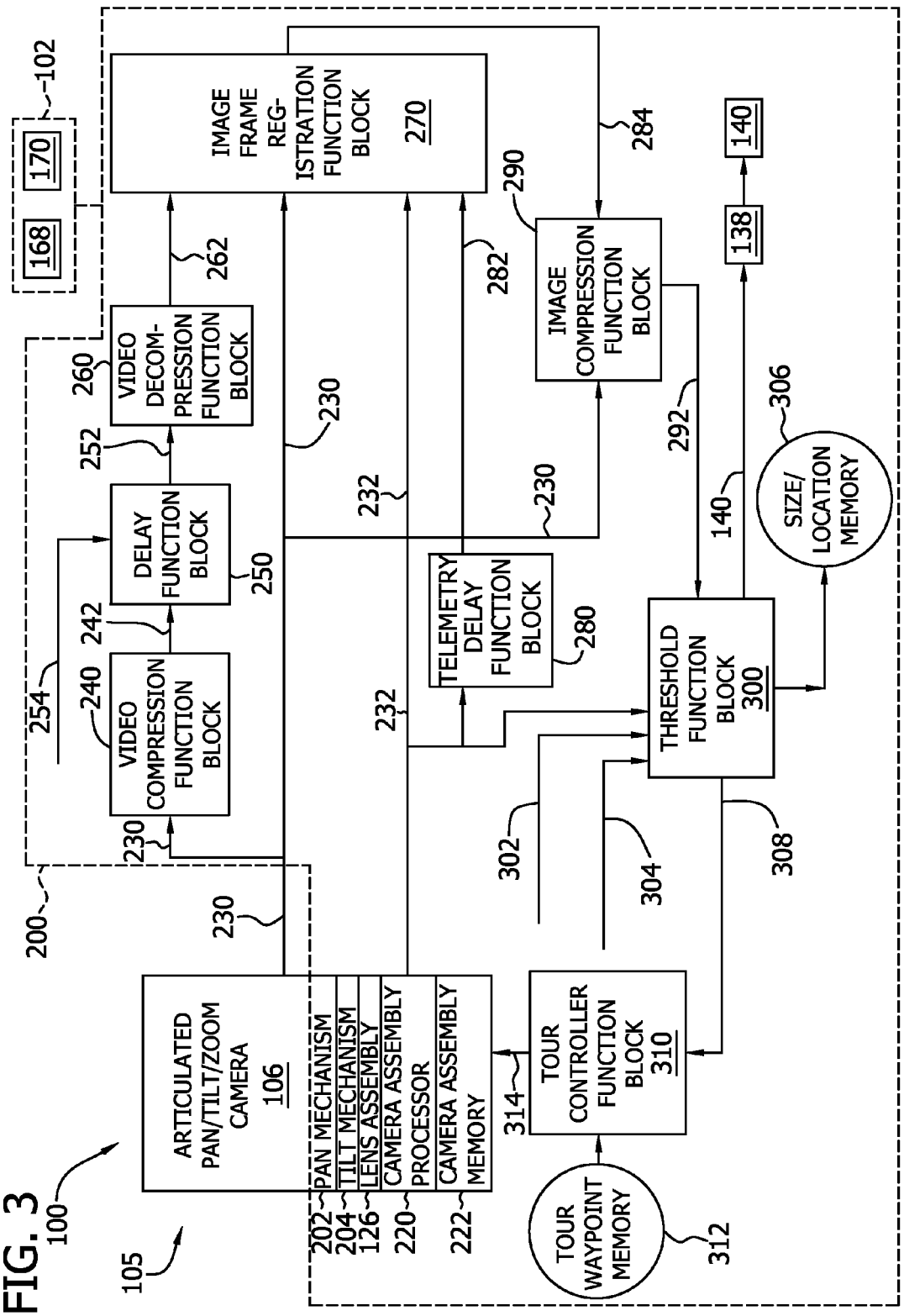

FIG. 3 is a schematic view of exemplary camera control system 200 that may be used with visual surveillance system 100, as shown in FIGS. 1 and 2, in the exemplary embodiment, control system 200 is coupled in communication with camera 106. Also, in the exemplary embodiment, camera assembly 105 includes a camera assembly processor 220 and a camera assembly memory 222 that each include sufficient resources to enable operation of control system 200 and surveillance system 100 as described herein. Processor 220 and memory 222 are coupled in communication with pan mechanism 202, tilt mechanism 204, and lens assembly 126.

As used herein, the term "function block" is substantially representative of at least one process step that is substantially performed by at least one hardware component within system 200. The terms "receives" and "transmits", and variations thereof, as used herein with respect to functional descriptions of such function blocks, should be interpreted as "substantially represents receiving" and "substantially represents transmitting", respectively.

Alternatively, system 200 is coupled in communication with control panel processor and memory, 168 and 170, respectively, to share processing and memory resources. More specifically, control panel processor and memory 168 and 170, respectively, provide processing overflow support to processor and memory 220 and 222, respectively, and/or processor and memory 220 and 222, respectively, provide processing overflow support to processor and memory 168 and 170, respectively. As a further aspect of this alternative embodiment, control panel processor and memory 168 and 170, respectively, are the sole processing components for system 200.

Referring to FIGS. 1, 2, and 3, during operation, camera assembly 105 responds to PTZ commands from processor 220. Moreover, in operation, camera 106 generates and transmits a video stream 230 that is substantially representative of at least a portion of control area 107 (shown in FIGS. 1 and 2). In addition, processor 220 generates and transmits a video telemetry stream 232 that is substantially representative of position feedback associated with current PTZ position for each of a plurality of video frames produced. Specifically, video telemetry stream 232 includes telemetry data that includes, but is not limited to, a current pan position, a current tilt position, and a current zoom setting of camera 106.

In the exemplary embodiment, portions of system 200 are programmed within processor 220 and/or memory 222. In addition to physical embodiments of processor 220 and memory 222, FIG. 3 also illustrates virtual portions of system 200 as programmed within processor 200 and/or memory 222.

Also, in the exemplary embodiment, control system 200 includes a video compression function block 240 programmed within processor 220. Function block 240 is programmed with any video compression software that includes compression algorithms to enable operation of system 200 as described herein including, but not limited to, MPEG and H.264. Video compression facilitates efficient and effective operation of processor 220 and memory 222 in the event processing resources contained therein are limited. Alternatively, given sufficient resources within processor 220 and memory 222, and/or sufficient processing resources associated with processor 168 and memory 170, compression is not used. In operation, function block 240 receives video stream 230, compresses stream 230 to a predetermined compression setting, and generates and transmits a compressed video stream 242.

Further, in the exemplary embodiment, control system 200 includes a delay function block 250 programmed within processor 220. In operation, function block 250 receives compressed video stream 242 and delays transmission of a delayed compressed video stream 252 by a predetermined temporal period. Such delay period is typically similar to a period of at least a portion of a tour performed by system 100, and is typically measured in units of seconds. Stream 252 is substantially similar to stream 242 with respect to content. Function block 250 receives a delay input signal 254. Such delay signal 254 includes either a static time delay or a variable, dynamic time delay. In operation, function block 250 receives compressed video stream 242 and transmits delayed compressed video stream 252.

Moreover, in the exemplary embodiment, control system 200 includes a video decompression function block 260 programmed within processor 220. Function block 260 is programmed with any video decompression software that enable operation of system 200 as described herein. In operation, function block 260 receives video stream 252, decompresses stream 252 to a predetermined decompression setting, and generates and transmits a decompressed delayed video stream 262.

In the exemplary embodiment, video stream 230 is a current tour video stream 230 and delayed video stream 262 is a previous tour video stream 262. Moreover, in the exemplary embodiment, both current tour video stream 230 and previous tour video stream 262 include a plurality of image frames (not shown).

Also, in the exemplary embodiment, control system 200 includes an image frame registration function block 270 programmed within processor 220. As described above, function block 270 receives current video stream 230 and previous tour video stream 262 as a series of video image frames at a predetermined frequency.

Further, control system 200 includes a telemetry delay function block 280 programmed within processor 220 that is substantially similar to delay function block 250. Function block 280 receives a current tour telemetry stream 232 that includes state information associated with camera 106, delays transmission for substantially the same temporal period as function block 250, and transmits a previous tour telemetry stream 282 that is substantially representative of position feedback associated with a previous PTZ position for each of a plurality of video frames produced. Video telemetry stream 282 includes telemetry data that includes, but is not limited to, a previous pan position, a previous tilt position, and a previous zoom setting of camera 106. Function block 270 receives current tour telemetry stream 232 and previous tour telemetry stream 282.

Image frame registration function block 270 substantially associates each video image frame of previous tour video stream 262 with a telemetry measurement of previous tour video telemetry stream 282, thereby generating a plurality of telemetry-stamped previous tour video image frames (not shown, hereinafter referred to as previous tour frames). Such association of telemetry data and video image data defines a map that facilitates distinguishing between static objects and objects that may have changed and/or shifted since the most recent tour. Also, image frame registration function block 270 substantially associates each video image frame of current tour video stream 230 with a telemetry measurement of current tour video telemetry stream 232, thereby generating a plurality of telemetry-stamped current tour video image frames (not shown, hereinafter referred to as current tour frames).

Function block 270 compares telemetry values associated with each previous tour and current tour video frames and determines if the frames are each representative of substantially similar camera position values. If the current and previous tour telemetry information is within a predetermined tolerance, the associated video frames are compared with each other (as discussed further below). In contrast, if the current and previous tour telemetry information is not within the predetermined tolerance, subsequent previous tour video frames are retrieved and compared with the current tour video frame until a substantial telemetry match is made.

Moreover, function block 270 is also programmed with at least one camera algorithm, or more specifically, motion-compensated blocks to define a motion estimation function that facilitates reducing a potential for errors between the associated current and delayed, or previous image frames by estimating a speed of objects within the image frames. Motion-compensation is used to refine an alignment of the current frames with the delayed, or previous frames. Upon selection of each current tour video image frame and its associated previous tour video image frame, both image frames are digitally disassembled into smaller units, or blocks of image pixels, that are subsequently digitally reassembled via the motion estimation function. Function block 270 generates and transmits a plurality of video image frames, known as key frames, at a predetermined frame rate, thereby generating and transmitting a registered previous tour image frame stream, hereon referred to as key frame stream 284.

Also, in the exemplary embodiment, system 200 includes an image frame comparison function block 290 programmed within processor 220. Function block 290 receives current video image frame stream 230 and key frame stream 284 and performs an image frame comparison, hereon a key frame comparison. More specifically, function block 290 executes a statistical analysis, that is, function block 290 digitally "subtracts" two associated images from each other, one image from key frame stream 284 and one associated image from current tour stream 232 (associated by telemetry data) to generate a virtual, residual image (not shown) of the differences between the two image frames. More specifically, each of the two image frames is broken down into a plurality of sub-blocks of image pixels, each sub-block having at least one statistical characteristic that includes, but is not limited to, light intensity, or luma. Such comparison is performed on successive pairs of associated images at a predetermined frame rate.

If the values of the measured statistical characteristics in at least a pair of associated sub-blocks (that is, one sub-block being associated with either a previous frame or a current frame) are substantially similar, that is, they do not exceed a predetermined difference parameter, then no difference is detected between the two frames, and function block 290 generates no outputs. If the differences in the measured statistical characteristics exceed the predetermined parameters, then a difference between the sub-blocks is noted, and function block 290 generates and transmits a frame difference signal 292. Signal 292 includes data associated with locations and approximate sizes of the sub-blocks which have exceeded the predetermined differences parameters and the associated telemetry data.

Further, in the exemplary embodiment, control system 200 includes a threshold function block 300 programmed within processor 220. Function block 300 receives signal 292 and monitors for locations and approximate sizes of the sub-blocks wherein differences between previous tour and current tour image frames have exceeded predetermined thresholds. Function block 300 also receives a speed variance signal 302 and a target size threshold signal 304. Speed variance signal 302 includes signals substantially representative of predetermined pan and tilt speed values, collectively referred to as tour speed values.

Function block 300 compares a magnitude of the image frame sub-block differences determined above against predetermined target size threshold values via signal 304. Function block 300 also compares existing tour speed values against tour speed values received via signal 302, and selects a value for tour speed that is consistent with value of the difference detected beyond size threshold signal 304. That is, a panning setpoint, or speed of camera 106 that is lower than a unity index setting (for a conventional tour speed) is selected. Similarly, a tilt speed setpoint that is lower than a unity index setting is selected. In the exemplary embodiment, the rate of traversing through the pan and tilt setpoints, or more specifically, the rate of pan and tilt deceleration, is indirectly proportional to the size of the determined differences. That is, the larger the difference, the lower the panning setting and the slower camera 106 will pan, up to and including a complete temporary cessation of panning. Similarly, the larger the difference, the lower the tilt setting and the slower camera 106 will tilt, up to and including a complete temporary cessation of tilting. As used herein, a conventional tour is a predetermined pass of a camera through a defined control area along a defined path with substantially static PTZ settings, such tour being repeatedly conducted.

If there are no differences, or the measured differences do not exceed a predetermined threshold, then the panning and tilting speeds of camera 106 are increased to predetermined speeds that are closer to, or exceed the unity index setting. Threshold function block 300 includes sufficient memory resources 306 that store a predetermined number of previous sizes and/or locations. These size/location pairs form a historical representation of activity in a certain volume of the tour. Function block 300 uses this data to disqualify areas which show repeated and statistically significant differences across multiple periods. This function acts as a filter to allow only true differences to trigger a lower than unity velocity.

Each tour is programmed to extend through a predetermined period of time from initiation to completion. As described above, the panning and tilting speeds may be increased above the unity setting to predetermined maximum values, thereby accelerating the conventional tours. Therefore, tours may be optimized by modulating a duration of the tours.

If there are substantial differences, or the measured differences exceed the predetermined threshold, the visual surveillance tour is shifted from a conventional tour at or above a unity setting to a patrol tour. During the patrol tour, camera 106 will pan and tilt at a slower speed and the visual surveillance tour will be traversed at a slower rate. The speed decrease, much like a human patrol officer, facilitates establishing a longer opportunity to evaluate and record the circumstances associated with the difference.

Function block 300 generates and transmits a velocity modifier signal 308 which is nominally indexed to 1.0, that is, unity being substantially representative of conventional panning and tilting settings, or pan and tilt speeds of camera 106. As described above, the velocity modifier is indexed to a lower value (that is, a lower speed) if a predetermined threshold value for image frame changes have been exceeded and indexed to a higher value (that is, a higher speed) if changes have not been detected.

Moreover, in the exemplary embodiment, control system 200 includes a tour controller function block 310 programmed within processor 220. Function block 310 is coupled in communication with a tour waypoint memory 312. Memory 312 is programmed with a plurality of waypoints, that is, a plurality of camera positioning coordinates. The waypoints, programmed in series as a function of time, defines a tour. The tour has a nominal speed which will complete the tour in a user-specified time, typically 1-5 minutes. Function block 310 receives velocity modifier signal 308 and a speed adjustment point on the function block 310 accepts modifications to the typical speed (indexed to 1.0 as described above) so as to speed up or slow down a tour. Function block 310 generates and transmits a series of PTZ command signals 314 that are received by processor 220, that in turn generates and transmits position command signals to pan mechanism 202, tilt mechanism 204, and lens assembly 126 for zoom adjustments.

Figure 4:
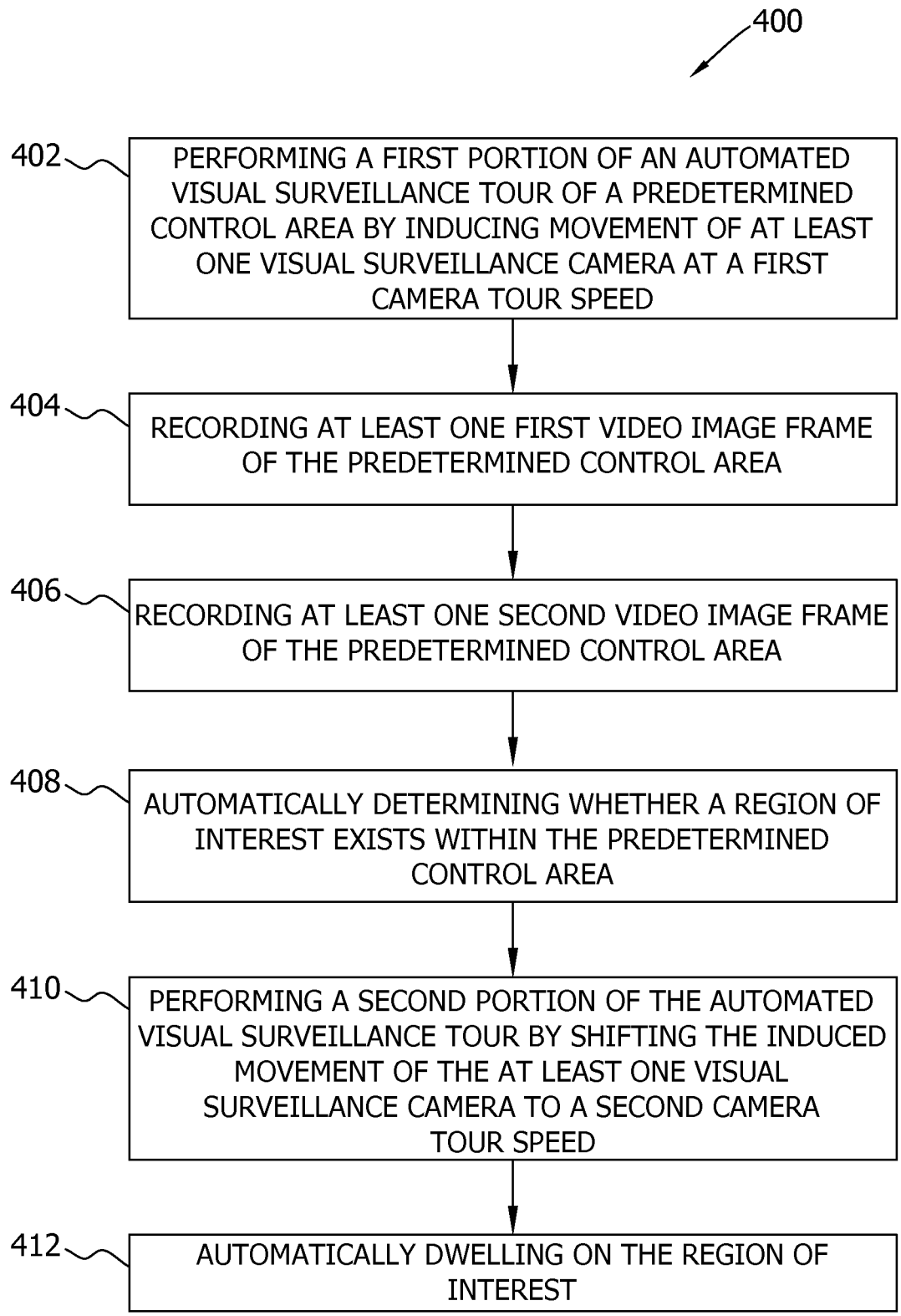

FIG. 4 is a flowchart of a method 400 for operating visual surveillance system 100, PTZ camera assembly 105, and camera control system 200 (shown in FIGS. 1-3, respectively). By performing method 400, an automated visual surveillance tour of predetermined control area 107 with at least one visual surveillance camera 106 is performed.

Referring to FIGS. 1, 2, 3, and 4, during operation of visual surveillance system 100 and camera control system 200, systems 100 and 200 operate in one of two modes, that is, a conventional tour mode and a patrol tour mode. In the exemplary embodiment, method 400 includes performing 402 a first portion of an automated visual surveillance tour of a predetermined control area by inducing movement of at least one visual surveillance camera at a first camera tour speed, that is, a first camera pan speed and a first camera tilt speed.

More specifically, during operation in the conventional tour mode, system 200 induces movement of camera 106 at predetermined first panning and tilting speeds that are indexed to unity (1.0), hereon referred to as the nominal touring speed, or a greater speed. System 200 induces movement of camera 106 and controls the touring speed of camera 106 via pan mechanism 202 and tilt mechanism 204. Also, during operation in conventional tour mode, system 200 may maintain a substantially constant zoom setting via lens assembly 126.

Further, during operation in the conventional tour mode, method 400 includes recording 404 at least one first video image frame of predetermine control area 107. Specifically, camera 106 generates and transmits video stream 230 that is substantially representative of control area 107 during a first tour, hereon referred to as the previous tour. Video stream 230 is compressed, delayed, and decompressed to generate a previous tour video frame stream 262. A delay value that is substantially representative of a typical conventional tour is used to facilitate comparison of image frames generated in the first tour with image frames generated in the next tour.

In addition, in substantial synchronism, processor 220 generates and transmits video telemetry stream 232 that is substantially representative of position feedback associated with current PTZ position for each of a plurality of video frames produced during the previous tour. Telemetry stream 232 is delayed in a manner that is substantially similar to that for video stream 230 to generate previous tour telemetry stream 282.

Moreover, during operation in the conventional tour mode, method 400 includes recording 406 at least one second video image frame of the predetermined control area. Specifically, camera 106 completes a first tour and starts a second tour with substantially similar PTZ settings as used in the first tour. During the second tour, camera 106 generates and transmits video stream 230 that is substantially representative of control area 107 during the second tour, hereon referred to as the current tour. In addition, in substantially synchronism, processor 220 generates and transmits video telemetry stream 232 that is substantially representative of position feedback associated with current PTZ position for each of a plurality of video frames produced during the previous tour.

Also, during operation in conventional tour mode, function block 270 receives current video stream 230 and previous tour video stream 262 as a series of video image frames at a predetermined frequency. Function block 270 also receives current tour telemetry stream 232 and previous tour telemetry stream 282. Moreover, function block 270 substantially associates each video image frame of previous tour video stream 262 with a telemetry measurement of previous tour video telemetry stream 282, thereby generating a plurality of previous tour frames. Such association of telemetry data and video image data defines a map that facilitates distinguishing between static objects and objects that may have changed and/or shifted since the most recent tour. Also, image frame registration function block 270 substantially associates each video image frame of current tour video stream 230 with a telemetry measurement of current tour video telemetry stream 232, thereby generating a plurality of telemetry-stamped current tour video image frames (not shown, hereon referred to as current tour frames).

Further, during operation in conventional tour mode, function block 270 compares telemetry values associated with each previous tour and current tour video frames and determines if the frames are each representative of substantially similar camera position values. If the current and previous tour telemetry information is within a predetermined tolerance, the associated video frames are compared with each other. In contrast, if the current and previous tour telemetry information is not within the predetermined tolerance, subsequent previous tour video frames are retrieved and compared with the current tour video frame until a substantial telemetry match is made.

Moreover, during operation in conventional tour mode, function block 270 estimates a speed of objects within the image frames. Upon selection of each current tour video image frame and its associated previous tour video image frame, both image frames are digitally disassembled into smaller units, or blocks of image pixels, that are subsequently digitally reassembled. Function block 270 generates and transmits key frame stream 284.

Also, during operation in conventional tour mode, function block 290 receives current video image frame stream 230 and key frame stream 284. Function block 290 executes a statistical analysis, that is, function block 290 digitally "subtracts" the two images from each other to generate a virtual, residual image (not shown) of the differences between the two image frames. More specifically, each of the two image frames is broken down into a plurality of sub-blocks of image pixels, each sub-block having at least one statistical characteristic such as, but not limited to, luma, i.e., a brightness measurement defined by a weighted sum of red, green, and blue colors.

Further, during operation in conventional tour mode, function block 290 makes a determination with respect to difference between each current tour video image frame and its associated previous tour video image frame, that is, function black 290 performs a key frame comparison. Specifically, if the values of the measured statistical characteristics in at least a pair of associated sub-blocks are substantially similar, that is, they do not exceed a predetermined difference parameter, then no difference is detected between the two frames, and function block 290 generates no outputs. If the differences in the measured statistical characteristics exceed the predetermined parameters, then a difference between the sub-blocks is noted, and function block 290 generates and transmits a frame difference signal 292. Signal 292 includes data associated with locations and approximate sizes of the sub-blocks which have exceeded the predetermined differences parameters and the associated telemetry data.

During operation in conventional tour mode, threshold function block 300 receives signal 292 and monitors for locations and approximate sizes of the sub-blocks wherein differences between previous tour and current tour image frames have exceeded predetermined thresholds. Function block 300 also receives speed variance signal 302 and target size threshold signal 304. Subsequently, function block 300 compares a magnitude of the image frame sub-block differences determined above against predetermined target size threshold values via signal 304.

System 200 performs the aforementioned key frame comparison with predetermined sensitivity settings. System 200 discriminates, for example, transits of the sun, motions of shadows, and typical weather patterns, thereby facilitating reducing periods wherein system 200 is operating in patrol tour mode unnecessarily.

Method 400 further includes automatically determining 408 whether a region of interest exists with predetermined control area 107.

If there are no differences, or the measured differences do not exceed a predetermined threshold, then the panning and tilting speeds of camera 106 are either maintained at unity or increased to predetermined speeds that are closer to the unity index setting. Therefore, systems 100 and 200 are maintained in the conventional tour mode, wherein the panning and tilting speeds may be maintained at or increased above the unity setting to predetermined maximum values, thereby accelerating the conventional tours, thereby optimizing the conventional tours.

If there are substantial differences, or the measured differences exceed the predetermined threshold, a region of interest within predetermined control area 107 is automatically determined and the visual surveillance tour is shifted from the conventional tour mode to a patrol tour mode and commences performing a patrol tour. The patrol tour is a deviation from the conventional tour. During the patrol tour, camera 106 pans and tilts at a slower speed and the visual surveillance tour is traversed at a slower rate. Specifically, in the exemplary embodiment, method 400 includes performing 410 a second portion of the automated visual surveillance tour by shifting the induced movement of the at least one visual surveillance camera to a second camera tour speed. More specifically, upon shifting to patrol tour mode, function block 300 also compares existing tour speed values against tour speed values received via signal 302, and selects a value for tour speed that is consistent with a value of the difference detected beyond size threshold signal 304. Also, the patrol tour speed is lower and function block 300 generates and transmits velocity modifier signal 308.

Moreover, in patrol tour mode, function block 310 receives velocity modifier signal 308 and function block 310 generates and transmits a series of PTZ command signals 314 that are received by processor 220, that in turn generates and transmits position command signals to pan mechanism 202, tilt mechanism 204, and lens assembly 126 for zoom adjustments. Specifically, in the exemplary embodiment, method 400 includes automatically dwelling 412 on the region of interest.

Pan mechanism 202, tilt mechanism 204, and lens assembly 126 are driven in concert with each other by function block 310 to pan, tilt and zoom in on the region of interest. Such operation is referred to as dwelling on the region of interest and any objects of interest identified in the region of interest are centered as well. Such objects of interest include objects entering, exiting, and moving within control area 107. The programmed responses to differences are associated with characteristics of the differences. For example, if the determined differences are localized and stationary, camera 106 will pause, center on the object, and zoom toward the object within a predetermined framing constraint, such as, but not limited to, 50% of a frame area. Also, for example, if the determined differences are localized and at least some motion was detected, a limited tracking feature will command camera 106 to zoom and track the object for a small duration of 3-4 seconds and then resume the conventional tour.

Video information associated with the region of interest and/or the object of interest recorded while in patrol tour mode is stored for later review. After a predetermined period of time in patrol tour mode, systems 100 and 200 automatically shift back to conventional tour mode. Upon return to the conventional tour mode, tour speed will be slowly restored to nominal tour speed.

As described herein, a reduction of the tour speed as a function of shifting from the conventional tour mode to the patrol tour mode facilitates greater detail capture of any dynamic objects (such as a vehicle or person) because the image acquisition duration is increased. Moreover, such greater detail may include, but not be limited to, facial features and vehicle features that are captured in a greater number of image frames. Furthermore, such greater detail facilitates an effectiveness of camera focus mechanisms and programmed video compression features, both of which facilitate image stability while reducing system-based apparent motion.

System 200 includes additional features that facilitate manual review of visual surveillance tour data recorded during periods in patrol tour mode. A first feature is a "quick review" that includes a replay of the most recent 15 seconds. A second feature is "forensic search" that facilitates forensic evaluations of images by tagging the associated video and telemetry streams with predetermined metadata. A third feature is "sidekick" wherein a main viewer is reduced and small pictures-in-picture (PIP) appear. Each PIP displays a loop version of the last 10-20 seconds of recorded video. Each of these features may be programmed within control panel 102, be used with monitor 104, and be initiated by buttons 164.

Moreover, system 200 includes tour initiation features that facilitate surveillance of control area 107. For example, system 200 may be programmed to initiate and/or restart a conventional tour from a predetermined start position and to consistently follow a predetermined tour route. Alternatively, system 200 may be programmed to initiate and/or restart a conventional tour at any random position along a predetermined tour with a random start direction, including a reversed tour path. Also, alternatively, system 200 may be programmed to restart a conventional tour in an active region of the tour and the tour is allowed to execute in a non-linear fashion, that is, the track as programmed by the user will be followed however, due to a weighting determined by camera activity metrics, the tour may follow portions of the track more frequently. The weighting will tend to highlight areas which have a recorded history of activity. Therefore, system 200 facilitates modulating a direction and a starting point of conventional tours, thereby increasing an appearance of randomness of tour conduct.

The above-described embodiments provide a visual surveillance system that is based on an automated surveillance tour that includes two distinct modes of operation, that is, a conventional tour mode and a patrol tour mode. The patrol tour mode as described herein facilitates focus and clarity of recorded and stored video image data due to the slowing down of camera panning and tilting. Specifically, slowing down the tour increases focus accuracy and facilitates performance of change detection algorithms. More specifically, slowing down or stopping the camera when difference information exists improves image clarity by facilitating a focus time constant of the camera to settle. Also, such slowing and/or stopping facilitates reducing an apparent global motion of other objects within the captured images which facilitates improving a performance of the compression algorithms. Furthermore, automated zooming of the camera lens on detected objects also facilitates increasing optical resolution on distant objects, moving or otherwise. Moreover, tracking moving objects as described herein facilitates an improvement in resolution.

Therefore, as described herein, a reduction of the tour speed as a function of shifting from the conventional tour mode to the patrol tour mode facilitates greater detail capture of any dynamic objects (such as a vehicle or person) because the associated duration of image acquisition is increased. Moreover, such greater detail may include, but not be limited to, facial features and vehicle features that are captured in a greater number of image frames. Furthermore, such greater detail facilitates an effectiveness of camera focus mechanisms and programmed video compression features, both of which facilitate image stability while reducing system-based apparent motion. Therefore, subsequent key frame comparison operations and manual operator reviews are facilitated because the objects being reviewed are clearer.

Another advantage to performing patrol tours as described herein includes reducing the amount of non-informational tour data recorded to long-term storage devices and/or media. Such a reduction in stored data is facilitated by only storing information collected during the patrol tours. More specifically, less time is expended recording scenes that do not change or have little new information and more time is expended on scenes that do change by increasing camera pan speed while touring in low information areas and decreasing the pan speed on scenes that show new information. Moreover, an additional optimization of recorded information can be achieved by modulating the recorded bit rate based on new information in the image. If the image contains no measurable differences then the bit rate can be set lower. If the scene contains new objects, or is congested, then it is qualified for a higher bit rate. Associated codec compression rate changes based on associated analytics provides a variable bit rate that is dependant on the information seen. Therefore, the information density stored within long-term storage devices and/or media is increased.

A further advantage to performing patrol tours as described herein includes using less time and resources recording video of control areas that are substantially static or include negligible change, and using more time investigating substantial changes within the control area. Therefore, surveillance of the control area is facilitated by dynamic touring and dwelling on regions and objects of interest as a function of changes therein and associated traffic.

An additional advantage is that a probability of the camera not capturing events and/or objects of interest is reduced since the patrol tour can be extended indefinitely to capture any differences found in the control area. Another advantage to performing patrol tours as described herein includes facilitating searches of archived video files to examine changes within a control area, thereby facilitating forensic examinations through the use of telemetry data. Also, a probability of the camera not capturing events and/or objects of interest is further reduced by modulating speed and time of conducting conventional tours as a function of inactivity in the control area and modulating start directions and start points of conventional tours.

A technical effect of the systems and method described herein includes at least one of: (a) performing a first portion of an automated visual surveillance tour of a predetermined control area by inducing movement of at least one visual surveillance camera at a first camera tour speed; (b) recording at least one first video image frame of the predetermined control area; (c) recording at least one second video image frame of the predetermined control area; (d) automatically determining a region of interest within the predetermined control area; (e) performing a second portion of the automated visual surveillance tour by shifting the induced movement of the at least one visual surveillance camera to a second camera tour speed; and (f) automatically dwelling on the region of interest.

Exemplary embodiments of a surveillance system and method for operating the same are described above in detail. The method and system are not limited to the specific embodiments described herein, but rather, components of systems and/or steps of the methods may be utilized independently and separately from other components and/or steps described herein. For example, the method may also be used in combination with other surveillance systems and methods, and are not limited to practice with only the visual surveillance system and method as described herein. Rather, the exemplary embodiment can be implemented and utilized in connection with many other visual surveillance applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    performing a first portion of an automated visual surveillance tour of a predetermined control area by inducing movement of at least one visual surveillance camera at a first camera tour speed;
    recording at least one first video image frame of the predetermined control area;
    recording at least one second video image frame of the predetermined control area;
    automatically determining whether a region of interest exists within the predetermined control area;
    performing a second portion of the automated visual surveillance tour by shifting the induced movement of the at least one visual surveillance camera to a second camera tour speed; and
    automatically dwelling on the region of interest,
    wherein automatically dwelling on the region of interest comprises increasing a recording bit rate.

2. A method in accordance with claim 1, wherein performing a first portion of an automated visual surveillance tour of a predetermined control area by inducing movement of at least one visual surveillance camera at a first camera tour speed comprises:
    performing a first automated visual surveillance tour of the predetermined control area with at least one of a first camera pan speed and a first camera tilt speed; and
    performing a second automated visual surveillance tour of the predetermined control area with at least one of the first camera pan speed and the first camera tilt speed.

3. A method in accordance with claim 2, wherein performing a second portion of the automated visual surveillance tour by shifting the induced movement of the at least one visual surveillance camera to a second camera tour speed comprises shifting from performing a conventional visual surveillance tour of the predetermined control area to performing an automated visual patrol tour of the predetermined control area.

4. A method in accordance with claim 1, wherein automatically determining a region of interest within the predetermined control area comprises comparing the at least one second video image frame with the at least one first video image frame.

5. A method in accordance with claim 4, wherein comparing the at least one second video image frame of the predetermined control area with the at least one first video image frame of the predetermined control area comprises performing an image frame comparison comprising delaying transmission of the at least one first video image frame of the predetermined control area using a memory portion of at least one of:
    the at least one visual surveillance camera;
    at least one processor coupled in communication with the at least one visual surveillance camera; and
    at least one video image storage device coupled in communication with at least one of the at least one visual surveillance camera and the at least one processor.

6. A method in accordance with claim 5, wherein performing an image frame comparison further comprises using at least one camera algorithm to register at least one image from at least a portion of at least one of a first automated visual surveillance tour, a second automated visual surveillance tour, and an automated visual patrol tour using at least one of motion-compensated blocks and statistical analyses.

7. A method in accordance with claim 6, wherein performing an image frame comparison further comprises one of:
    determining that there is no difference between the at least one second video image frame and the at least one first video image frame; and
    determining that there is a difference between the at least one second video image frame and the at least one first video image frame comprising at least one of:
        determining if at least one object has entered the predetermined control area;
        determining if at least one object has exited the predetermined control area; and
        determining if at least one object has moved within the predetermined control area.

8. A method in accordance with claim 7, wherein automatically dwelling on the region of interest further comprises at least one of:
    tilting the at least one visual surveillance camera toward the region of interest;
    changing a rate of tour of the at least one visual surveillance camera to a second tilt speed that is slower than a first tilt speed;
    changing a rate of tour of the at least one visual surveillance camera to a second pan speed that is slower than a first pan speed; and
    zooming in on the object within the region of interest with the at least one visual surveillance camera.

9. A method in accordance with claim 8, wherein zooming in on the at least one object comprises determining that the at least one object has characteristics that include at least one of:
    a motion component within the region of interest; and
    localized positioning within a predetermined portion of the region of interest.

10. A method in accordance with claim 1 further comprising modulating at least one of an automated visual surveillance tour direction, starting point, and duration.

11. A camera assembly, comprising:
    at least one visual surveillance camera; and
    at least one processor coupled in communication with said at least one visual surveillance camera, said at least one processor programmed to:
        record at least one first video image frame of a predetermined control area;
        record at least one second video Image frame of the predetermined control area;
        determine a region of interest and command said at least one visual surveillance camera to dwell on the region of interest;
        substantially associate each of said at least one first video image frame with a respective one of a first telemetry data representative of at least one of a first pan position, a first tilt position and a first zoom setting of said at least one visual surveillance camera; and substantially associate each of said at least one second video image frame with a respective one of a second telemetry data representative of at least one of a second pan position, a second tilt position and a second zoom setting of said at least one visual surveillance camera.

12. A camera assembly m accordance with claim 11 further comprising at least one of:
    a pan mechanism coupled in communication with said at least one processor;
    a tilt mechanism coupled in communication with said at least one processor; and
    a lens assembly coupled in communication with said at least one processor.

13. A camera assembly in accordance with claim 11 further comprising at least one video image storage device coupled in communication with said at least one visual surveillance camera and said at least one processor.

14. A camera assembly in accordance with claim 11, wherein said at least one processor is further programmed to:
    command said at least one visual surveillance camera to perform a first portion of a visual surveillance tour at a first camera tour speed;
    determine the region of interest within a predetermined control area; and
    command said at least one visual surveillance camera to perform a second portion of the visual surveillance tour at a second camera tour speed.

15. A camera assembly in accordance with claim 14, wherein said at least one processor is further programmed to:
    command said at least one visual surveillance camera to perform a first automated visual surveillance tour of the predetermined control area with at least one of a first camera pan speed and a first camera tilt speed; and
    command said at least one visual surveillance camera to perform a second visual surveillance tour of the predetermined control area with at least one of the first camera pan speed and the first camera tilt speed.

16. A camera assembly in accordance with claim 15, wherein said at least one processor is further programmed to determine at least one of:
    there are no substantial differences between said at least one second video image frame and said at least one first video image frame; and
    there is at least one substantial difference between said at least one second video image frame and said at least one first video image frame, wherein the at least one substantial difference includes at least one of:
        at least one object has entered the predetermined control area;
        at least one object has exited the predetermined control area; and
        at least one object has moved within the predetermined control area.

17. A visual surveillance system comprising:
    at least one visual surveillance camera;
    at least one video image storage device coupled in communication with said at least one visual surveillance camera; and
    at least one processor coupled in communication with said at least one visual surveillance camera and said at least one video image storage device, said at least one processor programmed to:
        record at least one first video image frame of a predetermined control area;
        record at least one second video Image frame of the predetermined control area;
        determine a region of interest and command said at least one visual surveillance camera to dwell on the region of interest;
        substantially associate each of said at least one first video image frame with a respective one of a first telemetry data of said at least one visual surveillance camera;
        substantially associate each of said at least one second video image frame with a respective one of a second telemetry data of said at least one visual surveillance camera; and
        determine at least one of:
            said first telemetry data associated with said at least one first video image frame is substantially similar to second telemetry data associated with said at least one second video image frame; and
            said first telemetry data associated with said at least one first video image frame is not substantially similar to second telemetry data associated with said at least one second video image frame.

18. A visual surveillance system in accordance with claim 17, wherein at least one of said at least one visual surveillance camera, said at least one video image storage device, and said at least one processor comprises a memory portion that stores at least a portion of at least one of a visual surveillance tour and a visual patrol tour.

19. A visual surveillance system in accordance with claim 17, wherein said at least one visual surveillance camera is a pan/tilt/zoom (PTZ) camera, said first telemetry data is representative of at least one of a first pan position, a first tilt position and a first zoom setting of said PTZ camera, and said second telemetry data is representative of at least one of a second an position, a second tilt position and a second zoom setting of said PTZ camear.

20. A visual surveillance system in accordance with claim 17, wherein said at least one processor is further programmed to:
    command said at least one visual surveillance camera to perform a first portion of a visual surveillance tour at a first camera tour speed;
    determine the region of interest within a predetermined control area; and
    command said at least one visual surveillance camera to perform a second portion of the visual surveillance tour at a second camera tour speed.

21. A visual surveillance system in accordance with claim 20, wherein said at least one processor is further programmed to:
    command said at least one visual surveillance camera to perform a first automated visual surveillance tour of the predetermined control area with at least one of a first camera pan speed and a first camera tilt speed; and
    command said at least one visual surveillance camera to perform a second visual surveillance tour of the predetermined control area with at least one of the first camera pan speed and the first camera tilt speed.

22. A visual surveillance system in accordance with claim 21 wherein said at least one processor is further programmed to determine at least one of:
    there are no substantial differences between said at least one second video image frame and said at least one first video image frame; and there is at least one substantial difference between said at least one second video image frame and said at least one first video image frame, wherein the at least one substantial difference includes at least one of:

at least one object has entered the predetermined control area;

at least one object has exited the predetermined control area; and at least one object has moved within the predetermined control area.

* * * * *